United States Patent [19]
Rigdon et al.

[11] 3,758,608
[45] Sept. 11, 1973

[54] PROCESS FOR ACID TREATING OF OLEFINS

[75] Inventors: Orville W. Rigdon, Groves; Anthony Macaluso, Sr.; William J. Powers, III, both of Port Arthur, all of Tex.

[73] Assignee: Texaco Inc., New York, N.Y.

[22] Filed: Aug. 26, 1971

[21] Appl. No.: 175,333

[52] U.S. Cl. .......................................... 260/677 AD
[51] Int. Cl. ........................................... C07c 11/12
[58] Field of Search ...................... 260/677 A, 677 S

[56] References Cited
UNITED STATES PATENTS

| | | | |
|---|---|---|---|
| 3,492,343 | 1/1970 | Garner et al. | 260/513 |
| 3,328,460 | 6/1967 | Mey | 260/505 |

Primary Examiner—Delbert E. Gantz
Assistant Examiner—Juanita M. Nelson
Attorney—Thomas H. Whaley et al.

[57] ABSTRACT

Olefins, such as $C_5$ to $C_{30}$ olefins formed by thermal cracking of long chain normal paraffins, are subjected to acid treatment by contacting the olefins in liquid phase at a temperature of about 0° to about 225°F. and, preferably, from about 50° to about 100°F., with an adsorbent supported sulfuric acid composition. The process can be conducted, for example, by passing the olefin in liquid phase through a bed of free-flowing, granular, solid adsorbent supported sulfuric acid composition prepared, for example, by contacting an adsorbent, such as silica gel, with sulfuric acid. The spent treating composition can be conveniently reclaimed by burning off the accumulation of adsorbed materials or through solvent action and the recovered silica gel reused in preparing an additional amount of the silica gel supported sulfuric acid material. The acid treated olefins are highly useful for production of olefin sulfonate detergents having an improved color.

9 Claims, No Drawings

PROCESS FOR ACID TREATING OF OLEFINS

BACKGROUND OF THE INVENTION

1. Field of the Invention

This invention relates to an improved process for acid treating of olefins. More particularly, this invention relates to a process in which liquid olefins, such as alpha olefins of $C_5$ to $C_{30}$ carbon chain length are treated by contacting the olefins with an adsorbent supported sulfuric acid composition, such as a silica gel supported sulfuric acid composition. Such treated olefins are useful for preparing olefin sulfonates of improved color.

2. Description of the Prior Art

Thermal cracking of long chain normal paraffins is the most economical method for production of normal alpha olefins. Olefins produced by wax cracking, however, are not as desirable as Ziegler olefins in several potential applications since they contain more impurities than olefins produced by Ziegler oligomerizations of ethylene.

Potentially the largest volume application for alpha olefins is as feedstock for the production of alpha olefin sulfonate (AOS) detergents.

Alpha olefins and especially those derived from the cracking of petroleum hydrocarbon, i.e., cracked wax olefins, not only tend to be straw colored, but in addition contain compounds which, although colorless themselves, form highly colored compounds on reaction with $SO_3$. These intensely colored compounds which are present in the sulfonate product are polysulfonated polyenes which possibly are derived by oxidation and subsequent sulfonation.

When commercial alpha olefins are utilized in preparing olefin sulfonates for use in detergent compositions it is necessary to treat the olefin employed prior to sulfonation in order to reduce the color level of the sulfonate product. A variety of processes have been advanced in the art for accomplishing this, however, they all suffer from one or more serious disadvantage. It has been suggested that the olefins be purified by passing them over adsorbents, such as clays, or that they be washed with a variety of solvents. Likewise, treatment of the olefins with sulfuric acid has been employed however, because of the numerous processing steps (i.e., contacting the olefin with the acid, allowing the mixture to settle and removing the acid layer, neutralizing the olefin layer followed by repeated washing and finally drying), because the treatment has often resulted in the isomerization of some of the olefins to internal olefins, and because the olefins react to some extent with the sulfuric acid itself, this process has not proven to be satisfactory in practice.

Acid treatment of the cracked wax olefin feed, according to the process of U.S. Pat. No. 3,492,343, prior to sulfonation, results in the removal of the color precursors, i.e., the conjugated di- and polyenes from the olefin feed stream, and in the production of an AOS product with acceptable color properties.

In this process, the olefin feedstock is contacted with aqueous sulfuric acid, the aqueous and organic layers are separated and the latter is contacted with an adsorbent such as Fuller's Earth. The process, as described, suffers from several disadvantages in commercial operation:

1. The treating agent, 85 to 87 wt. percent sulfuric acid, is highly corrosive to standard metallurgical systems,
2. The acid concentration and contacting and settling times are highly critical, and
3. The process is less effective from the point of final AOS color when operated continuously than when it is operated batchwise.

There is a definite need in the art, therefore, for an efficient process for treating olefins so that they are suitable for the production of detergent grade sulfonates. A principal object of this invention is to provide an efficient treatment process for the removal of color precursors such as conjugated di- and polyenes from olefin streams such as those derived by wax cracking.

Another object of this invention is to provide an olefin treatment process in which a free-flowing, granular treatment material is utilized rather than the difficult and hazardous to handle concentrated sulfuric acid.

Another object of this invention is to provide a process in which olefins in liquid form are passed through a bed of solid, granular, adsorbent supported sulfuric acid, thereby avoiding the agitation required with concentrated sulfuric acid.

Another object of this invention is to provide a process in which the efficiency of reaction between sulfuric acid and impurities in the olefin stream is high due to increased contact surface of the high surface area adsorbent employed to prepare the adsorbent supported sulfuric acid composition.

Another object of this invention is to provide a process in which the sludge formed during the treating process clings to the adsorbent supported sulfuric acid solid and is easily removed from the treated olefin stream.

BRIEF DESCRIPTION OF THE INVENTION

In the process of this invention olefins having from five to 30 carbon atoms and, preferably, alpha olefins of the formula:

$$R - CH = CH_2$$

wherein R is straight chain alkyl of from three to 28 inclusive carbon atoms, as exemplified by propyl, butyl, pentyl, hexyl, octyl nonyl, decyl, dodecyl, pentadecyl, nonadecyl, eicosyl, hexacosyl, heptacosyl, etc. are subjected to acid treatment by contacting the olefin in liquid phase with a free-flowing, granular, adsorbent supported sulfuric acid composition at a temperature of about 0° to about 225°F. and, preferably, at about 50° to about 100°F.

It has been found that the process of this invention possesses a number of significant advantages over other art recognized processes in which the olefins are contacted directly with concentrated acid. First, the use of the solid matrix, i.e., the high surface area adsorbent as exemplified by silica gel, alumina, silica-alumina, diatomaceous earth, activated clays, such as Porocel clay, a hard, highly adsorbent activated bauxite marketed by the Englehard Minerals and Chemicals or, montmorillonite clay, fuller's earth, etc. to support the liquid sulfuric acid, permits the sulfuric acid to be handled as if it were a solid such as in a fixed bed flow application. Second, the carrier acts to limit the free acid in the olefin phase of the mixture with a resultant advantage in product workup. Third, the dispersed condition of the supported sulfuric acid provides more intimate contacting between the olefin and acid than would be available with bulk sulfuric acid.

DETAILED DESCRIPTION OF THE INVENTION

The preparation of the free-flowing, granular adsorbent supported sulfuric acid utilized in this invention can be conveniently accomplished, for example, by mixing together a granular, high surface area adsorbent having a mesh size of from about 4 to about 300 and, preferably, from about 8 to about 16, with sulfuric acid having a concentration of from about 50 and about 100 weight percent and, preferably, from about 90 to about 100 weight percent. The high surface area adsorbent employed must be substantially free of physically adsorbed water. The mixing time required is related to the mesh size of the particular adsorbent employed. For example, silica gel mesh size distribution between 28 to 200 will require about 20 minutes to completely adsorb the acid whereas almost 90 minutes are required for the 6–16 mesh size distribution. During the addition of the sulfuric acid to the adsorbent, heat may be generated which may make cooling necessary. The quantity of sulfuric acid admixed with the granular adsorbent can be varied widely and generally the amount employed is such that the adsorbent supported sulfuric acid composition will contain from about 5 to about 70 weight percent of sulfuric acid (calculated as $H_2SO_4$) and preferably from about 25 to about 60 weight percent sulfuric acid on the same basis.

In an alternate method, the carrier supported sulfuric acid compositions can be prepared in a flow system in which, for example, the carrier is packed in a column and the acid permitted to trickle down through the bed.

The sulfuric acid of the sulfuric acid impregnated adsorbent, i.e., the adsorbent supported sulfuric acid composition, is tightly held within the pores of the adsorbent by adsorption or by the formation of a complex compound between the acid and the adsorbent.

No aftertreatment of the adsorbent supported sulfuric acid composition is required and after the free-flowing granular product has been formed, the composition which is readily handled is ready for immediate use. Alternatively, the sulfuric acid impregnated adsorbent product can be stored for a considerable period of time provided contact with moisture is not permitted.

High surface area adsorbent supported sulfuric acid compositions can also be prepared by the method described in U.S. Pat. No. 2,434,833. Granular silica gel, for example, of any desired mesh size having a water content of from 3 to 15 percent by weight is placed in a suitable vessel and a stream of gaseous sulfur trioxide is passed into and through the silica gel. Conveniently, the gaseous sulfur trioxide may be produced by heating fuming sulfuric acid to a temperature sufficiently high to drive off the sulfur trioxide as a gas or by vaporizing solid or liquid sulfur trioxide. The reaction on the sulfur trioxide with the water entrained in the silica gel forms concentrated sulfuric acid in the pores of the gel and at the same time considerable heat is generated which may be employed to remove any excess sulfur trioxide from the gel. The concentrated sulfuric acid in the gel, which is substantially 100 percent sulfuric acid, may contain dissolved sulfur trioxide. The gel, prior to use, may be flushed with a dry inert gas, such as nitrogen, hydrogen, etc. at about 212°F. or higher to remove any free sulfur trioxide from the formed sulfuric acid held in the pores.

In the process of this invention the intimate contacting of the olefin with the free-flowing, granular, sulfuric acid impregnated adsorbent supported sulfuric acid can be conducted as a batch, intermittent or continuous process. Preferably, the process is conducted as a continuous operation in which the olefin stream is passed through a bed of the impregnated adsorbent suitably arranged in a vessel or tower. The adsorbent supported sulfuric acid composition may be arranged on a series of trays or a single bed of the adsorbent material may be utilized. With proper selection of the mesh size of the adsorbent supported sulfuric acid composition the process may be carried out as a fluidized bed operation. A wide range of space velocities may be employed when the process of this invention is operated continuously. Generally, weight hourly space velocities (WHSV) of from about 0.5 g charge /g adsorbent supported acid/hour to about 20 g charge /g adsorbent supported acid/hour may be used although preferably the WHSV will be from about 5 to about 15.

A particular advantage of the process is that the sludge and acids formed tightly cling to the adsorbent supported sulfuric acid composition and are retained thereon while the treated olefin remains relatively free of acid and sludge. In batch operations the spent adsorbent supported sulfuric acid composition is merely allowed to settle to the bottom of the treatment tank and the spent composition can be conveniently removed by centrifugation, filtration, etc., if desired.

In order to remove the final traces of the acidic bodies from the treated olefin stream it is desirable to pass the effluent from the tower or column containing the adsorbent supported acid composition through a second treatment bed containing an adsorbent such as silica gel, alumina, silica-alumina, diatomaceous earth, activated clay, such as Porocel clay, montmorillonite clay, fuller's earth, etc. Alternatively, this second treating step can consist of washing the olefin stream with a dilute aqueous solution of an inorganic base, such as sodium, potassium, or lithium hydroxide, carbonate or bicarbonate.

The adsorbent can be reprocessed by removing the sludge therefrom by a variety of methods such as by washing with solvents as exemplified by methyl alcohol, diethyl ether, tetrahydrofuran, treatment with steam, burning with air, etc. After the sludge has been completely removed the reclaimed adsorbent may be treated with sulfuric acid or sulfur trioxide to again form the adsorgent supported sulfuric acid composition which can be recycled to the treatment process.

The following examples illustrate various embodiments of this invention and are to be considered not limitative.

EXAMPLE I

Fresh unburned Porocel clay that had been dried in a vacuum oven, 100g, was placed in a clean beaker. Concentrated (96–98 weight percent) sulfuric acid, 74g, was slowly added while the clay was stirred with a glass rod. The mixture was allowed to stand for about one hour at ambient temperature during which time it hardened. After the resulting material had been broken up with a spatula, concentrated (96–98 weight percent) sulfuric acid, 30g, was added to 100g of the broken, vitrified clay. The final sulfuric acid concentration was calculated at 55.7 weight percent.

EXAMPLE II

Treatment of a $C_{11}$—$C_{16}$ Cracked Wax Olefin Fraction with Silica Gel Supported Sulfuric Acid Dessicant grade silica gel, 6-16 mesh, 200g, was placed in a 600 ml beaker and 100g of 96–98 weight percent sulfuric acid was added with stirring in small portions. This mixture was placed in the top column of the treatment apparatus which was arranged so that the effluent therefrom could be gravity fed to a lower column containing reburned Porocel clay, 500g. Five hundred grams of a $C_{11}$—$C_{16}$ cracked wax olefin cut was charged in one portion to the top column and the effluent from the lower column collected in nominal 50 ml fractions. When the percolation through the lower column was complete, this column was flushed with two 50 ml portions of n-pentane after which the pentane was removed from the residue by nitrogen stripping. Overall weight recovery was 456g (91.2 weight percent). Conjugated diene analyses on the effluent fractions, which are given in Table I below, indicate that by this treatment a substantial reduction in conjugated diene content had been achieved.

TABLE 1

CONJUGATED DIENE REMOVAL FROM $C_{11}$-$C_{16}$ CRACKED WAX OLEFIN CUT WITH SILICA GEL SUPPORTED SULFURIC ACID

EXAMPLE II

| | |
|---|---|
| Conj. Diene Content, Charge mol % | 1.07 |
| Conj. Diene Content, Frac. No. 3, mol % | 0.68 |
| Conj. Diene Content, Frac. No. 5, mol % | 0.83 |
| Conj. Diene Content, Frac. No. 7, mol % | 0.82 |
| Conj. Diene Content, Frac. No. 9, mol % | 0.84 |
| Conj. Diene Content, Frac. No. 11, mol % | 1.02 |

EXAMPLES III-V

Treatment of Cracked Wax Olefins with Sulfuric Acid Impregnated Clay at Various Acid/Clay Ratios A series of sulfuric acid impregnated fresh porocel clay compositions prepared by the procedure described for the preparation of the silica gel supported sulfuric acid composition in Example II were employed in treating various cracked wax olefin streams in the same manner as set forth in Example II. Results presented in Table 2, which follows, show that as the acid/clay ratio increases, the effectiveness of the mixture for conjugated diene removal also increases. Results obtained in Example IV indicated that a mixture containing 74g 96–98 weight percent $H_2SO_4$/100g fresh Porocel is especially effective in conjugated diene removal.

TABLE 2

TREATMENT OF CRACKED WAX OLEFINS WITH ACID IMPREGNATED CLAY: EFFECT OF VARYING ACID/CLAY RATIOS

| Example No. | III | IV | V |
|---|---|---|---|
| Carbon No. (Charge) | $C_6$-$C_{13}$ | $C_{11}$-$C_{13}$ | $C_{11}$-$C_{14}$ |
| Conj. Diene Content, Chg,mol% | 2.32 | 1.18 | 1.18 |
| Gms $H_2SO_4$/100gms Clay | 33.3 | 40 | 74 |
| Gms Chg/Gm Acid Impreg. Clay | 3 | 8.6 | 10 |
| Conj. Diene Content Product mol % | 1.88 | 1.04 | 0.56 |

EXAMPLE VI

Treatment of $C_{10}$—$C_{16}$ Cracked Wax Olefins by Contacting with Acid Impregnated Clay (AIC) Followed by Clay Percolation Utilizing apparatus of the same type as described in Example II, a $C_{10}$–$C_{16}$ cracked wax olefin cut containing 1.16 mol percent conjugated dienes was charged using a metering pump to the top column of the treatment unit which contained acid impregnated clay prepared by the procedure described in Example I. Effluent from the top column was gravity fed to a second column containing Porocel clay. Olefins were charged at a WHSV of 10g olefin/g clay supported sulfuric acid/hr up to a total throughput of 25g olefin/g clay supported sulfuric acid (AIC). Results which are given in Table 3, below, indicate the substantial reduction of conjugated diene content resulting from treatment of the olefin stream by the process of this invention.

EXAMPLE VII

Conjugated Diene Removal by the Sequence: Clay Contacting-Absorbent Supported Sulfuric Acid Contacting-Clay Persolation This example was performed in the same manner as Example VI, except that the charge (a $C_{10}$—$C_{16}$ cracked wax olefin) was stored over fresh porocel clay (0.8g olefin/g clay) for 14 hours. Prior to contacting with the adsorbent supported sulfuric acid the olefin charge had a conjugated diene content of 0.54 mol percent. Conjugated diene analyses on the effluent are given in Table 3. As disclosed in Table 3, the removal of the conjugated dienes by this process is highly effective.

TABLE 3

| Example No. | VI | VII |
|---|---|---|
| Conj. Diene Content, Chg, mol % | 1.16 | 0.54 |
| WHSV g chg/g AIC/hur | 10 | 10 |
| Conj. Diene Content Product, mol % at 10g chg/g AIC Throughput | 0.52 | 0.22 |
| Conj. Diene Content Product, mol % at 20g chg/g AIC Throughput | - | 0.24 |
| Conj. Diene Content Product, mol % at 25g chg/g AIC Throughput | 0.78 | 0.27 |

In order to compare the results obtained with the process of this invention and with a treatment process corresponding to that of U.S. Pat. No. 3,492,343, the following experiment was conducted:

A $C_{11}$—$C_{16}$ cracked wax olefin cut containing 1.07 mol percent conjugated dienes was charged to a nitrogen blanketed, 500 ml, 3-necked flask equipped with a bottom drawoff. Sulfuric acid (86 weight percent $H_2SO_4$), 15g, was added and the mixture stirred briskly at ambient temperature for ten minutes. The mixture was allowed to stand at ambient temperature and the lower (aqueous) layer withdrawn and discarded. The product was a reddish brown translucent oil, weighing 294g (98 weight percent charge). This oil was percolated through a column of 500g of reburned Porocel clay yielding a water white olefin mixture, 274 g (91.3 weight percent of charge), containing 0.75 mol percent conjugated dienes.

The reduction of conjugated diene content of the cracked wax olefin achieved in this experiment is considerably less than that achieved with the process of this invention in Examples II and V—VII.

What is claimed is:

1. A process for treating an olefin having from five to 30 carbon atoms which comprises contacting the said olefin in liquid phase with an adsorbent supported sulfuric acid composition, the said adsorbent of the adsorbent-supported sulfuric acid composition being selected from the group consisting of silica gel, activated clay, fuller's earth, diatomaceous earth, montmorillonite clay and silica-alumina, and wherein the acid composition contains from about 5 to about 70 percent by weight of sulfuric acid.

2. The process of claim 1 wherein after the step of contacting the said olefin with the adsorbent supported sulfuric acid composition the resulting olefin stream is contacted with an adsorbent in order to remove acidic bodies therefrom.

3. The process of claim 1 wherein after the step of contacting the said alpha olefin with the adsorbent supported sulfuric acid composition the resulting olefin stream is washed with an aqueous alkaline solution to remove acidic bodies therefrom.

4. The process of claim 1 wherein the said olefin is contacted with the said adsorbent supported sulfuric acid composition at a temperature of from about 0° to about 225°F.

5. The process of claim 1 wherein the said olefin is an alpha olefin of the formula:

$$R—CH=CH_2$$

wherein R is straight chain alkyl of from three to 28 carbon atoms.

6. The process of claim 5 wherein in the said alpha olefin R is 3 to 18 inclusive.

7. A process for treating an alpha-olefin which comprises:

a. contacting an alpha-olefin of the formula:

$$R—CH=CH_2,$$

wherein R is straight chain alkyl of from three to about 28 carbon atoms, with a granular, adsorbent supported sulfuric acid composition containing from about 5 to about 70 weight percent of sulfuric acid, at a temperature of from about 0° to about 225°F., and b. contacting the resulting alpha-olefin stream with an adsorbent to remove acid bodies therefrom.

8. The process of claim 7 wherein the said adsorbent supported sulfuric acid composition is a silica gel supported sulfuric acid composition and the said adsorbent employed in step (b) is activated clay.

9. The process of claim 7 wherein the said adsorbent supported sulfuric acid composition is an activated clay supported sulfuric acid composition and the said adsorbent employed in step (b) is activated clay.

* * * * *